United States Patent [19]

Habermehl

[11] Patent Number: 4,930,630
[45] Date of Patent: Jun. 5, 1990

[54] SCREW STRIP WITH WASHERS

[76] Inventor: Gordon L. Habermehl, #1 Tall Pine Road, Port Sydney, Ontario, Canada, P0B 1L0

[21] Appl. No.: 414,514
[22] Filed: Sep. 29, 1989
[30] Foreign Application Priority Data Jun. 15, 1989 [CA]  Canada ................................. 602955

[51] Int. Cl.⁵ ............................................. B65D 73/00
[52] U.S. Cl. .................................. 206/347; 206/820
[58] Field of Search ............................ 206/338–348, 206/820

[56] References Cited

U.S. PATENT DOCUMENTS

| 2,784,405 | 3/1957 | Working, Jr. ................. 206/338 |
| 3,944,068 | 3/1976 | Maier et al. ................... 206/347 |
| 3,955,674 | 5/1976 | Maier et al. ................... 206/347 |
| 4,018,344 | 4/1977 | Lejdegard ..................... 206/347 |
| 4,019,631 | 4/1977 | Lejdegard et al. ............ 206/347 |
| 4,047,611 | 9/1977 | Damratowski ................ 206/347 |
| 4,146,071 | 3/1979 | Mueller et al. ................ 144/32 S |
| 4,167,229 | 9/1979 | Keusch et al. ................. 206/343 |
| 4,383,608 | 5/1983 | Potucek ........................ 206/347 |

FOREIGN PATENT DOCUMENTS

| 1040600 | 10/1978 | Canada ........................... 219/1 |
| 1054982 | 5/1979 | Canada ........................... 219/2 |
| 1071907 | 2/1980 | Canada ........................... 81/26 |

Primary Examiner—Jimmy G. Foster
Attorney, Agent, or Firm—Riches, McKenzie & Herbert

[57] ABSTRACT

A screw strip is disclosed in which each screw carries a washer on its screw shank between the tip of the screw and a plastic strip carrying a plurality of screws. This configuration permits application of screws carrying the washers by power tools as is particularly useful in sheet metal applications.

11 Claims, 1 Drawing Sheet

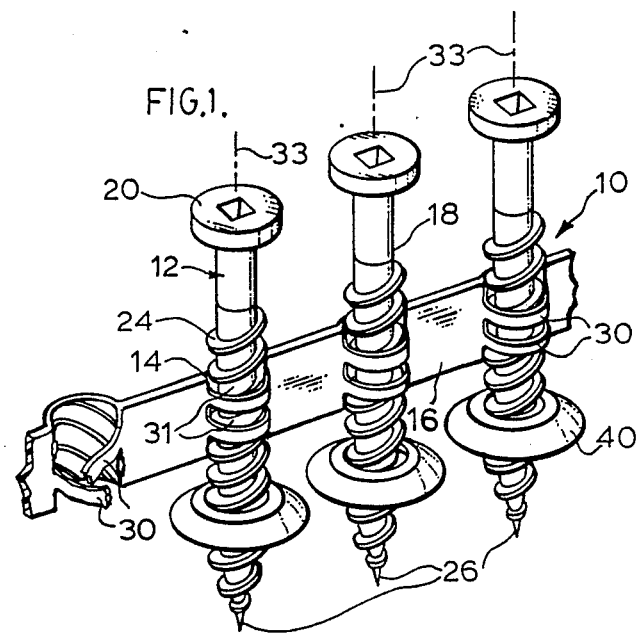
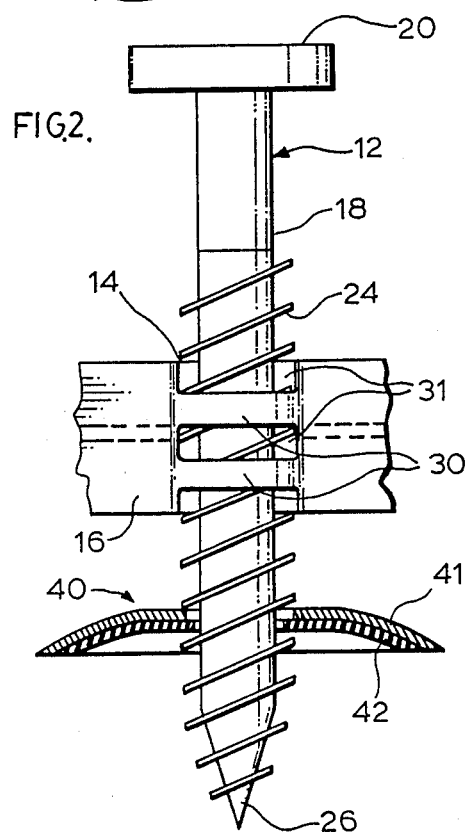

SCREW STRIP WITH WASHERS

SCOPE OF THE INVENTION

This invention relates to a unitary holding strip made of plastic materials for retaining a plurality of screws in a row and, more particularly, to such a strip adapted to hold both screws and washers.

BACKGROUND OF THE INVENTION

Many screw strips are known whereby the screws are connected to each other by a retaining belt of plastic material. These strips are engaged by a head of a power-driven screw blade and then screwed into a workpiece. In the course of the blade engaging the screw and/or driving the same into the workpiece, the screw becomes detached from the plastic strip.

In many threaded fastening applications, there is a need to apply threaded fasteners carrying washers. For example, in the application of metal sheeting, known systems for automatically applying screws do not provide a convenient method for automatically applying both threaded fasteners and washers. Screw strips are not presently available which permit automatic application of both screws and washers.

One known type of screw strip is that of Carl M. Reich, Machinenfabrik G.m.b.H. as described in Canadian Patent Nos. 1,040,600 issued Oct. 17, 1978 and 1,054,982 issued May 22, 1979.

SUMMARY OF THE INVENTION

To overcome disadvantages of the prior art, the present invention provides a plastic holding strip for holding a plurality of screws carrying washers in a row in which the strip has a plurality of spaced parallel sleeves interconnected by lands with a screw threadably received in each sleeve with its head extending from one end of the sleeve and its threaded shank extending from the other end of the sleeve and a washer frictionally engaged on the threaded shank between the sleeve and the tip of the screw.

An object of the present invention is to provide a plastic screw strip for holding screws and carrying washers for automatic application of the same.

Another object is to provide a simplified method for applying sheet metal screws carrying washers.

Accordingly, in one of its aspects the present invention provides a plastic holding strip for holding a plurality of screws carrying washers in a row, the strip comprising spaced parallel sleeves interconnected by lands with one of the screws received in each sleeve, each screw having a head at one end, a tip at the other end and a threaded shank extending from below the head to the tip, each screw received in each sleeve with the screw's head extending from one end of the sleeve and the screw's tip extending from the other end of the sleeve, a washer engaged about the shank of each screw between the sleeve receiving that screw and the screw's tip, the sleeve threadably engaging the threaded shank, the sleeve having a reduced strength portion between the lands such that a screw on being threaded tip first into a workpiece is automatically separated from its sleeve carrying the washer while simultaneously maintaining the length of the strip substantially intact and while guiding the screw by threaded engagement of the screw in its respective sleeve. Preferably, the screws are sheet metal screws with the washers including an annular ring of elastomeric material disposed about the shank of the screw to frictionally engage the screw against accidental removal.

Notwithstanding a long-felt need in the industry, plastic holding strips for holding both screws and washers are not commercially available and have been unable to reasonably be produced or provide useful operation. The applicant has appreciated that plastic holding strips of the type described in Canadian Patents Nos. 1,040,600 and 1,054,982 can be adapted so as to hold screws carrying washers in a row and permit screws carrying the washers to be applied automatically. The present applicant has appreciated that by utilizing a screw strip in accordance with these two patents, the washer may be located between the tip of the screw and screw strip and, thus, does not interfere with the normal operation of the screw holding strip. By suitable sizing of the washer so as to be frictionally engaged on the threaded shank of the screw below the strip, the washer may be retained on the screws during manufacture and use of the screw strip yet the screw may, under suitable forces applied by a driving screwdriver blade, be driven carrying the washer to suitably sandwich the washer under the head of the screw onto the workpiece. In accordance with the present invention, conventional washers may be used, however, washers may preferably be used having tolerances so as to provide a friction-fit on the screw shank and so as to permit the washer to remain substantially axially aligned about the shank of the screw facilitating close spacing of the screws along the strip without undue interference between washers.

This strip of the invention is particularly adapted to carry screws for piercing sheet metal and rubber-backed sealing washers for such screws.

BRIEF DESCRIPTION OF THE DRAWINGS

Further aspects and advantages of the present invention will become apparent from the following description taken together with the accompanying drawings in which:

FIG. 1 shows a pictorial view of the screw strip in accordance with Canadian Patent No. 1,054,982 modified in accordance with the present invention so as to carry washers thereon;

FIG. 2 is a side elevation view of one screw in the strip of FIG. 1.

DETAILED DESCRIPTION OF THE DRAWINGS

Reference is made to FIG. 1 which shows a screw strip generally indicated 10 carrying a plurality of screws 12. The screw strip comprises an elongate thin band formed by a plurality of identical sleeves 14 interconnected by generally flat lands 16. A screw 12 is received within each sleeve 14. Each screw 12 has a head 20, a shank 18 carrying external threads 24 and a tip 26, preferably pointed. As shown, the external threads 24 extend from below the head 20 to the tip 26.

Each screw is received with its threaded portion engaged within the sleeve. In forming these sleeves about the screw as in the manner described in Canadian Patent No. 1,040,600, the interior surfaces of the sleeves come to be formed with complimentary threaded portions which engage the external threads of the screws.

As best seen in FIG. 2, each sleeve has perforations 31 longitudinally aligned on one of its sides between the lands leaving, in effect, thin strap-like wall portions 30. This provides, in effect, a reduced strength portion in the sleeve between lands.

Each screw is shown to carry on its threaded shank between the strip and the tip of the screw, a washer 40. The washer has interior surfaces in frictional engagement with the external threads 24 The washer, thus, is retained on the screw against accidental release due to handling, vibration and the like. Washer 40 has been shown as a washer for use with sheet metal and comprises a metal cover 41 and a rubber ring 42. Preferably, rubber washer 42 will have the central aperture through which the screw passes sized so as to frictionally engage the shank 18 of the screw to hold the washer on the screw before application.

In use, in a manner as described in both the above-mentioned Canadian patents and preferably with a device of the type as described in Canadian Patent No. 1,071,907, the screw and washer carrying strip is fed to a position in line with a screwdriver head. The screwdriver head engages the head of the screw and rotates the same driving it forwardly into a workpiece, for example, sheet metal. By reason of the threaded shank 18 of the screw being threadably engaged by the sleeve 14, the sleeve serves to guide the screw into initial engagement with the workpiece. Thereafter, further threading of the screw draws the screw through the sleeve 14 with the sleeve rupturing at the strap-like wall portions 30. FIG. 1 shows at the left-hand side one sleeve from which a screw has been driven and strap-like wall portions 30 ruptured. The screw is then driven totally down into the workpiece through the washer capturing the washer between the workpiece and the screw head.

The washers do not interfere with the driving action nor with rupture of the sleeve of the strip by reason of the location of the washer between the sleeve and the tip of the screw.

The strap-like portions 30 may be eliminated as in the manner described in Canadian Patent No. 1,040,600 in which case the perforations 31 would form a continuous axially extending slot preferably extending about the screw, in a circumferential manner, an extent of between about 210° to 270°. In this case, the longitudinal slot extending along the length of the sleeve forms the reduced strength portion.

The screws in accordance with the present invention may have any recess-type drive such as PHILLIPS or ROBERTSON type recesses for engagement of a blade of the screwdriver or may have externally shaped heads such as hexagonal or square for engagement by socket-wrench type drivers. ROBERTSON square-type slots are preferred. The screws may be threaded and/or self-tapping.

As is to be appreciated from FIG. 1, axial center lines 33 of the sleeves should be spaced a distance along the strip at least equal to the diameter of the washers.

While the invention has been described with reference to preferred embodiments, it is not so limited. Many variations and modifications will now occur to those skilled in the art. For a definition of the invention, please see the attached claims.

What I claim is:

1. A plastic holding strip for holding a plurality of screws carrying washers in a row,
   the strip comprising spaced parallel sleeves interconnected by lands with one of the screws received in each sleeve,
   each screw having a head at one end, a tip at the other end and a threaded shank extending from below the head to the tip,
   each screw received in each sleeve with the screw's head extending from one end of the sleeve and the screw's tip extending from the other end of the sleeve,
   a washer engaged about the shank of each screw between the sleeve receiving that screw and the screw's tip,
   the sleeve threadably engaging the threaded shank,
   the sleeve having a reduced strength portion between the lands such that a screw on being threaded tip first into a workpiece is automatically separated from its sleeve carrying the washer while simultaneously maintaining the length of the strip substantially intact and while guiding the screw by threaded engagement of the screw in its respective sleeve.

2. A strip as claimed in claim 1 wherein the washer is frictionally engaged on the threaded shank of the screw.

3. A strip as claimed in claim 2 wherein the washer is spaced from the sleeve towards the tip.

4. A strip as claimed in claim 3 wherein the distance between axial centers of the sleeve is at least equal to the diameter of the washers.

5. A strip as claimed in claim 1 wherein the sleeves extend along a portion of the threaded shank in an axial direction thereof and comprise inwardly facing screw threads for receiving the threaded shank.

6. A strip as claimed in claim 5 wherein the sleeves only partially surround said screws to form said reduced strength portion.

7. A strip as claimed in claim 6 wherein the sleeves enclose the threaded shank about a peripheral angle within the range of about 210° to 270°, whereby the sleeves have longitudinally extending slots.

8. A strip as claimed in claim 1 wherein the sleeves completely surround the threaded shank of each screw and are formed with longitudinal aligned perforations along one side thereof, substantially between the lands, defining said reduced strength portion.

9. A strip according to claim 8 wherein the perforations are formed by strap-like wall portions of each sleeve.

10. A strip as claimed in claim 1 wherein said lands and sleeves have a wall thickness substantially smaller than an outer thread diameter of said screw.

11. A strip as claimed in claim 1 wherein said screws comprise sheet metal screws and said washers comprise an annular ring of elastomeric material disposed about the shank of the screw frictionally engaging the screw.

* * * * *